(12) United States Patent
Liu

(10) Patent No.: US 11,845,241 B2
(45) Date of Patent: Dec. 19, 2023

(54) LAMINATE CONTAINING AN ADHESION PROMOTER LAYER AND METHOD OF MAKING THE LAMINATE

(71) Applicant: CANON KABUSHIKI KAISHA, Tokyo (JP)

(72) Inventor: Weijun Liu, Cedar Park, TX (US)

(73) Assignee: CANON KABUSHIKI KAISHA, Tokyo (JP)

(*) Notice: Subject to any disclaimer, the term of this patent is extended or adjusted under 35 U.S.C. 154(b) by 156 days.

(21) Appl. No.: 17/205,367

(22) Filed: Mar. 18, 2021

(65) Prior Publication Data

US 2022/0297410 A1 Sep. 22, 2022

(51) Int. Cl.
| | | |
|---|---|---|
| *B32B 27/06* | (2006.01) | |
| *B32B 27/28* | (2006.01) | |
| *B32B 7/12* | (2006.01) | |
| *B32B 37/12* | (2006.01) | |
| *B32B 33/00* | (2006.01) | |

(Continued)

(52) U.S. Cl.
CPC ............. *B32B 27/06* (2013.01); *B32B 7/12* (2013.01); *B32B 27/16* (2013.01); *B32B 27/281* (2013.01); *B32B 27/283* (2013.01); *B32B 37/12* (2013.01); *C08F 2/50* (2013.01); *C08F 220/1807* (2020.02); *C08F 220/1811* (2020.02); *C08F 220/36* (2013.01); *C08F 222/102* (2020.02); *C09J 5/00* (2013.01); *B32B 2037/1253* (2013.01); *B32B 2250/02* (2013.01); *C08F 120/36* (2013.01); *C09J 2301/416* (2020.08); *C09J 2433/00* (2013.01)

(58) Field of Classification Search
CPC ........... B32B 27/06; B32B 7/12; B32B 27/16; B32B 27/281; B32B 27/283; B32B 33/00; B32B 37/12; B32B 2037/1253; B32B 2250/02; C08F 2/50; C08F 220/1807; C08F 220/1811; C08F 220/36; C08F 222/102; C08F 120/36; C09J 5/00; C09J 2301/416; C09J 2433/00; C09J 2203/326; C09J 2475/00; C09J 7/30; B82Y 40/00; C09D 4/00; C09D 133/14
USPC ....................................... 428/424.2
See application file for complete search history.

(56) References Cited

U.S. PATENT DOCUMENTS

| | | |
|---|---|---|
| 5,270,082 A | 12/1993 | Lin |
| 8,106,134 B2 | 1/2012 | Egashira |

(Continued)

FOREIGN PATENT DOCUMENTS

WO    WO-2013094969 A2 *    6/2013    ........... G02B 5/3025

OTHER PUBLICATIONS

Machine translation of WO 2013/094969 A2 (Year: 2013).*

*Primary Examiner* — John D Freeman
*Assistant Examiner* — Steven A Rice
(74) *Attorney, Agent, or Firm* — Abel Schillinger, LLP

(57) ABSTRACT

A laminate can contain a substrate, an adhesion promoter layer, and a coating layer, wherein the adhesion promoter layer may include an isocyanate group containing compound of formula (1): $R_1-R_2-N=C=O$ (1), with $R_1$ being a functional group different than the isocyanate group, and $R_2$ being substituted or unsubstituted alkyl or aryl. The adhesion promoter layer can provide strong adhesion of the coating layer to the substrate by forming covalent bonds with the substrate and covalent bonds with the coating layer.

22 Claims, 1 Drawing Sheet

(51) Int. Cl.
*C08F 220/18* (2006.01)
*C08F 220/36* (2006.01)
*C09J 5/00* (2006.01)
*B32B 27/16* (2006.01)
*C08F 222/10* (2006.01)
*C08F 2/50* (2006.01)
*B82Y 40/00* (2011.01)
*C08F 120/36* (2006.01)

(56) References Cited

U.S. PATENT DOCUMENTS

| | | |
|---|---|---|
| 9,275,560 B2 | 3/2016 | Zhang |
| 9,617,454 B2 | 4/2017 | Gaillard |
| 10,342,899 B2 | 7/2019 | Delaney, Jr. |
| 10,457,597 B2 | 10/2019 | Wang |
| 10,507,321 B2 | 12/2019 | Young |
| 2003/0072932 A1* | 4/2003 | Gandon .............. C03C 17/3405 |
| | | 428/212 |
| 2010/0112236 A1 | 5/2010 | Fletcher |
| 2011/0256394 A1* | 10/2011 | Nishio .................... B32B 27/08 |
| | | 428/354 |
| 2012/0016050 A1 | 1/2012 | Leon |
| 2013/0011632 A1 | 1/2013 | Ogino |

* cited by examiner

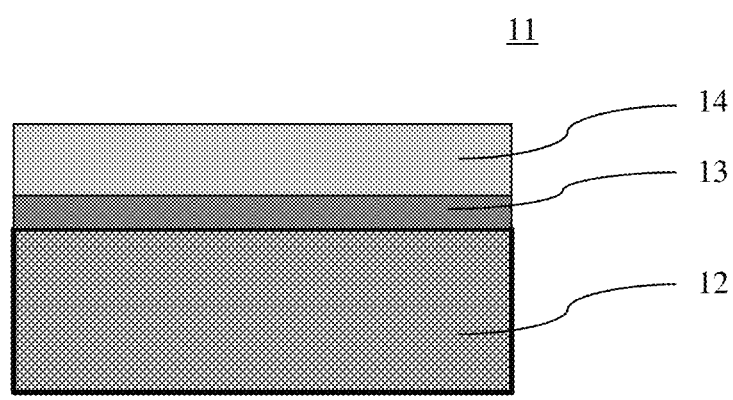

LAMINATE CONTAINING AN ADHESION PROMOTER LAYER AND METHOD OF MAKING THE LAMINATE

FIELD OF THE DISCLOSURE

The present disclosure relates to a laminate containing a substrate, an adhesion promoter layer, and a coating layer, and a method of making the laminate. In a particular aspect, the adhesion promoter layer includes an isocyanate-group containing compound and the coating layer includes a photo-cured resist or a parylene.

BACKGROUND

Adhesion materials in nanoimprint lithography (NIL) and inkjet adaptive planarization (IAP) typically do not work well on organic polymeric surfaces, for example, on polyimide-based substrates.

Similarly, parylene coatings, which are known as protective coatings in a large variety of fields, such as electronics, aerospace, or medical devices, are known to attach well to metals or ceramics, but do not function, as desired, on many organic polymeric surfaces, such as polyimide (Kapton).

There exists a need to further develop adhesion systems which can provide strong adhesion of resist layers or parylene coatings to organic polymeric substrates, particularly, to polyimide substrates.

SUMMARY

In one embodiment, a laminate can comprise a substrate, an adhesion promoter layer directly overlying the substrate, the adhesion promoter layer including an isocyanate group containing compound of formula (1): $R_1-R_2-N=C=O$ (1), with $R_1$ being a functional group different than the isocyanate group, and $R_2$ being substituted or unsubstituted alkyl or aryl; and a coating layer directly overlying the adhesion promoter layer.

In one aspect, $R_1$ of formula (1) can be selected from an acrylate group, a methacrylate group, a vinyl group, or a halogen.

In another aspect, the isocyanate group containing compound of formula 1 can be selected from:

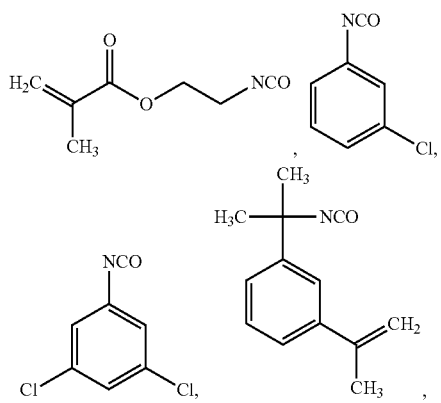

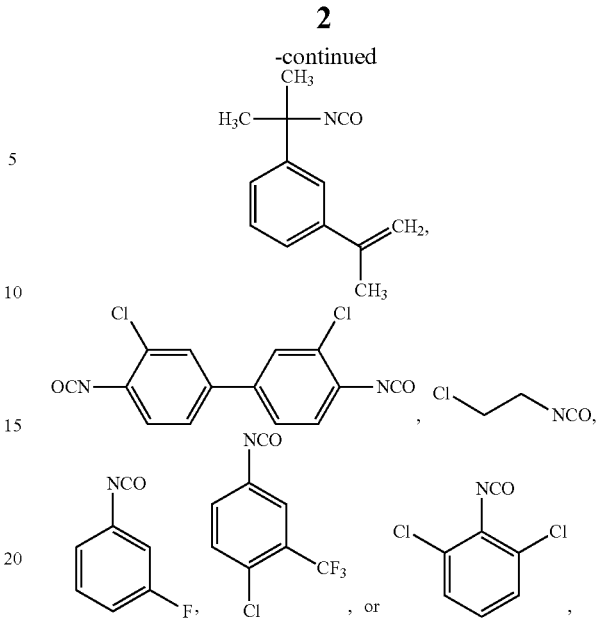

or any combination thereof.

In one aspect of the laminate, the substrate can include a polymer, silicon, a glass, a ceramic, a metal, or a metal alloy.

In a particular aspect, the substrate can include an organic polymer. In a certain particular aspect, the substrate can include a polyimide.

In one embodiment of the laminate, the coating layer can be a cured resist, wherein the cured resist can comprise polymerized acrylate units and/or polymerized methacrylate units.

In a certain aspect of the laminate, the coating layer can be a cured resist and the substrate can be a polyimide or silicon.

In a further aspect of the laminate, the coating layer can include a poly(p-xylylene) polymer. In a certain aspect, the coating layer may include a chlorinated poly(p-xylylene) polymer.

In a particular aspect of the laminate, the substrate can include a polyimide, and the coating layer can be a chlorinated poly(p-xylylene).

In a further embodiment, a method of forming a laminate can comprise: applying an adhesion promoter layer directly on a substrate, wherein the adhesion promoter layer comprises an isocyanate group containing compound of formula 1: $R_1-R_2-N=C=O$ (1), with $R_1$ being a functional group different than the isocyanate group, and $R_2$ being substituted or unsubstituted alkyl or aryl; and applying a coating layer directly overlying the adhesion promoter layer.

In one aspect, the method can include forming of covalent bonds between the adhesion promoter layer and the substrate, and forming of covalent bonds between the adhesion promoter layer and the coating layer.

In one embodiment of the method, applying the coating layer can include applying a photocurable composition on the adhesion promoter layer and curing the photocurable composition to form a cured resist.

In one aspect of the method, the coating layer can include a cured resist and the substrate can be a polyimide.

In another aspect of the method, the coating layer can include a cured resist and the substrate may be silicon.

In another embodiment of the method, applying the coating layer can include vapor depositing a poly(p-xylylene) polymer. In a particular aspect, the poly(p-xylylene)

polymer can be a chlorinated poly(p-xylylene) polymer. The chlorinated poly(p-xylylene) may be selected from parylene C or parylene D.

In one aspect of the method, the coating layer can be a chlorinated poly(p-xylylene) polymer, and the substrate can include an organic polymer. In a certain particular aspect, the coating layer can be a chlorinated poly(p-xylylene) polymer and the substrate may be a polyimide.

BRIEF DESCRIPTION OF THE DRAWINGS

Embodiments are illustrated by way of example and are not limited in the accompanying FIGURES.

FIG. 1 includes an illustration of a laminate according to one embodiment.

Skilled artisans appreciate that elements in the figures are illustrated for simplicity and clarity and have not necessarily been drawn to scale. For example, the dimensions of some of the elements in the FIGURES may be exaggerated relative to other elements to help improve understanding of embodiments of the invention.

DETAILED DESCRIPTION

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

As used herein, the terms "alkyl" group or "aryl" are used to encompass groups having no substituents (e.g., an unsubstituted alkyl group) but can also include substituted groups (e.g., a substituted alkyl group or a substituted aromatic ring).

In one embodiment, as illustrated in FIG. 1, the present disclosure is directed to a laminate (11) comprising a substrate (12), an adhesion promoter layer (13) directly overlying the substrate (12), and a coating layer (14) directly overlying the adhesion promoter layer (13). The adhesion promoter layer (13) can include an isocyanate group containing compound of formula (1): $R_1—R_2—N=C=O$ (1), with $R_1$ being a functional group different than the isocyanate group, and $R_2$ being substituted or unsubstituted alkyl or aryl. As shown in embodiments herein, the adhesion promoter layer can assist in an excellent adhesion of the coating layer to the substrate.

In one aspect, the functional group of R1 of formula (1) can be selected from acrylate, methacrylate, a vinyl, halogen, hydroxyl, amine, epoxy, carboxyl, or maleimide, but may not be limited thereto. In a certain particular aspect, R1 can be an acrylate group, a methacrylate group, a vinyl group, or a halogen.

In another aspect, R2 of formula 1 can be $C_1$-$C_{10}$ alkyl, or phenyl, or biphenyl.

In a certain aspect, the isocyanate group containing compound of formula 1 can be a small molecule having a molecular weight not greater than 1000 g/mol, not greater than 500 g/mol, not greater than 400 g/mol, not greater than 300 g/mol, or not greater than 200 g/mol.

In particular aspects, the isocyanate group containing compound of formula 1 may be selected from the following structures or combination thereof:

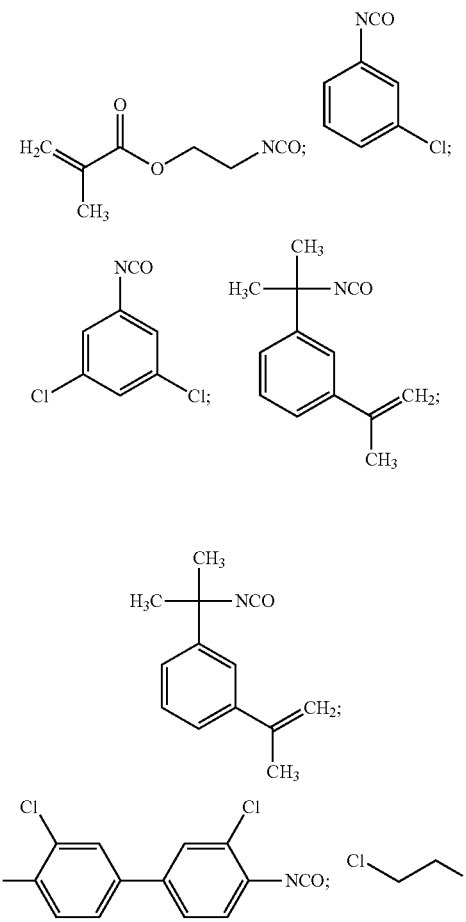

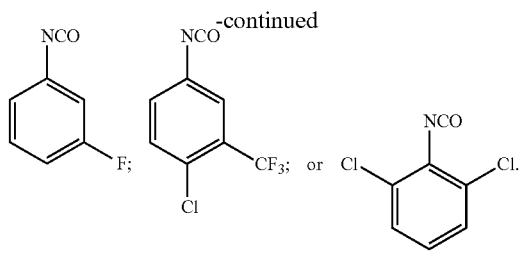

In one aspect, the isocyanate group containing compound of formula 1 of the adhesion promoter layer (13) can form covalent bonds with the substrate (12) and covalent bonds with the coating layer (14). In a certain aspect, the isocyanate groups of the isocyanate group containing compound can form covalent bonds with functional groups of the substrate. In another certain aspect, the functional groups R1 of the isocyanate group containing compound (which are not isocyanate groups) may form covalent bonds with functional groups of the coating layer.

In another aspect, depending on the material of the substrate and the coating layer, the isocyanate groups of the adhesion promoter can also form covalent bonds with the coating layer, while the functional groups of R1 may form covalent bonds with the substrate. It is further appreciated that to a certain extent the isocyanate groups and the functional groups of R1 can form covalent bonds to both the substrate and the coating layer.

As used herein, the phrase "isocyanate group containing compound of formula 1" is interchangeable used with the term "adhesion promoter," if not indicated otherwise.

As used herein, the term "laminate" is also called interchangeable "coated substrate" or "multi-layer structure," if not indicated otherwise.

In one embodiment, a method of forming the laminate (11) of the present disclosure can include: i) applying an adhesion promoter layer (13) directly on a substrate (12); and ii) applying a coating layer (14) directly on the adhesion promoter layer (13).

The substrate (12) of the laminate (11) can be a material selected from a polymer, silicon, silica, glass, a ceramic, a metal, or a metal-alloy. In a particular embodiment, the substrate can be an organic polymer selected from a polyimide, a polyamideimide, a polyurethane, a polyethyleneimine, a polycarbonate, or a polyester. Not being bound to theory, functional groups contained in the outer surface region of substrate can react by forming covalent bonds with the cyanate and/or functional group R1 of the adhesion promoter of formula 1.

In one particular aspect, the adhesion promoter layer can be applied on the substrate by vapor deposition. In one aspect, vapor deposition can be adapted that only a single layer of molecules of the adhesion promoter is deposited on the substrate. In another aspect, the adhesion promoter layer can contain a plurality of adhesion promoter molecules along a thickness direction of the layer.

In another particular aspect, the adhesion promoter layer can be applied by immersing the substrate in an adhesion promoter containing solution, thereby allowing the adhesion promoter to be adsorbed on the substrate surface, followed by removing the treated substrate from the solution and drying the substrate. In a certain aspect, a solution of an organic solvent containing between 0.1 wt % to 5 wt % of a dissolved adhesion promoter may by used for immersing the substrate and forming an adhesion promoter layer.

In other aspects, the adhesion promoter layer can be also applied by spin-coating, spraying, dip-coating, or brushing.

In a further aspect, the thickness of the adhesion promoter layer can be at least 0.5 nm, such as at least 1 nm, at least 2 nm, at least 5 nm, at least 10 nm, at least 15 nm, or at least 20 nm. In another aspect, the thickness of the adhesion promoter layer can be not greater than 100 nm, such as not greater than 80 nm, not greater than 50 nm, not greater than 40 nm, not greater than 30 nm, or not greater than 25 nm. The thickness of the adhesion promoter layer can be a value between any of the minimum and maximum values noted above, such from 0.5 nm to 100 nm, or from 1 nm to 10 nm.

In one aspect, an amount of the adhesion promoter in the adhesion promoter layer can be at least 50 wt %, or at least 80 wt %, or at least 90 wt %, or at least 95 wt %, or at least 98 wt %, or at least 99 wt %, or at least 99.5 wt %, or at least 99.9 wt %. In a particular aspect, the adhesion promoter layer can consist essentially of the adhesion promoter, except for unavoidable impurities.

In another aspect, the adhesion promoter layer can include an additive or may be distributed within a polymeric matrix. Non-limiting examples of additives can be novolac resin, an epoxy resin, an acrylic resin, or other polymer resins.

In one embodiment, the coating layer can be a cured resist. In one aspect, the cured resist can be formed by photo-curing a liquid photocurable composition including a polymerizable material. The polymerizable material can include one or more monomers, oligomers, polymers or combinations thereof, which may form a polymeric network if initiated to polymerization and/or crosslinking reactions.

In one aspect, the polymerizable material of the photocurable composition may include at least one vinyl-group containing monomer, for example, an acrylate monomer, or a methacrylate monomer, or vinylbenzene.

After applying the photocurable composition on the adhesion promoter layer, covalent bonds can be formed between the adhesion promoter and the functional groups of the polymerizable material of the photocurable composition. Not being bound to theory, it is assumed that the functional groups R1 of formula 1 of the adhesion promoter can react with functional groups of the polymerizable material of the photocurable composition during curing of the photocurable composition and thereby form covalent bonds which provide a strong adhesion of the cured resist to the underlying substrate.

The amount of polymerizable material in the photocurable composition can be at least 20 wt %, or at least 40 wt %, or at least 60 wt %, or at least 80 wt %, or at least 90 wt %, or at least 95 wt % based on the total weight of the photocurable composition.

In a further aspect, the photocurable composition can contain a solvent which is not polymerizable and can be removed by drying before and/or during the polymerization. In another certain aspect, the photocurable composition can be essentially free of a solvent.

In one embodiment, the viscosity of the photocurable composition at 23° C. can be at least 1.0 cP, at least 5 cP, at least 10 cP, at least 15 cP, at least 20 cP, or at least 30 cP. In another embodiment, the viscosity may be not greater than 100 cP, such as not greater than 70 cP, not greater than 50 cP, not greater than 40 cP, or not greater than 30 cP. The viscosity of the photocurable composition can be a value between any of the minimum and maximum values noted above. All viscosities recited herein are viscosities measure with the Brookfield method, using a Brookfield Viscometer LVDV-II+Pro at 200 rpm, with a spindle size #18 and a spin speed of 135 rpm.

In yet a further aspect, the photocurable composition of the resist can contain at least one additive. Non-limiting examples of an additive can be a surfactant, a dispersant, a stabilizer, a co-solvent, an initiator, an inhibitor, or any combination thereof.

In a particular embodiment, the coating layer of the laminate can be an imprint resist layer attached to a wafer substrate by the adhesion promoter layer and adapted for a nanolithographic process.

The contact angle of a liquid resist to the applied surface is an important parameter in nanoimprinting, since it affects the drop spreading of the resist and the further performance during processing. As a general rule can be applied that the smaller the contact angle the faster the drop spreading. In one aspect, the contact angle of a liquid resist dropped on the adhesion promoter layer of the present disclosure can be not greater than 30 degrees, such as not greater than 25 degrees, not greater than 20 degrees, not greater than 15 degrees, or not greater than 10 degrees. In a particular embodiment, the contact angle can be not greater than 20 degrees within a time period of 0.1 seconds to 1.5 seconds.

In another embodiment, the coating layer of the laminate of the present disclosure can include a poly(p-xylylene) polymer, also called a "parylene" coating. Examples of parylene coatings can be:

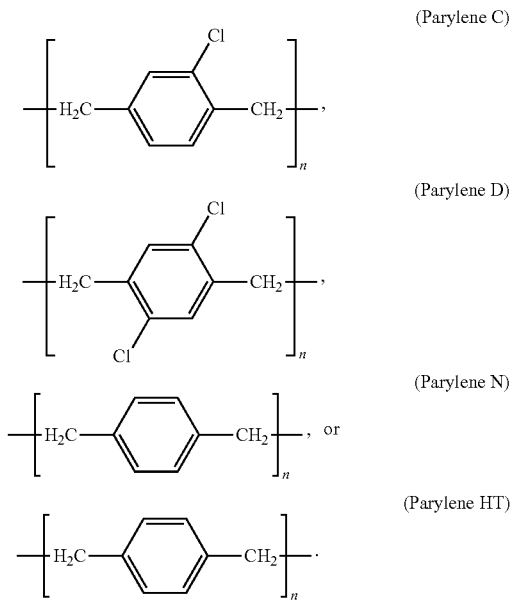

In a certain particular aspect, the coating layer (14) of the laminate (11) can be a chlorinated poly(p-xylylene) polymer, such as parylene C or a parylene D coating. In a certain particular aspect, the coating layer is a parylene C coating.

The parylene coating can be applied by vapor deposition process. Typically, parylene vapor deposition can involve vaporization of a dimer starting compound, pyrolysis of the dimer, and forming the parylene polymer during deposition on a solid surface.

In one aspect, the thickness of the parylene coating may be at least 1 micron, or at least 10 microns, or at least 1000 microns. In another aspect, the thickness of the parylene coating may not be greater than 1000 microns, or not greater than 100 microns, or not greater than 10 microns.

In a certain particular aspect, the laminate can contain a polyimide substrate or a substrate having an outer polyimide layer and the coating layer may be a parylene C layer.

In a further embodiment, the present disclosure is directed to a method of attaching a resist layer to a substrate. The method can comprise the following steps: applying an adhesion promoter layer described above on a surface of a substrate; applying a layer of a liquid photocurable composition directly on top of the adhesion promoter layer; and curing the photocurable composition.

In a particular embodiment, the photocurable composition can be applied by ink-jetting in a J-FIL nanoimprinting process. Depending on the material of the photocurable composition, curing can be also conducted by a combination of UV radiation and heat treatment.

In another embodiment, the present disclosure is directed to a method of forming a photo-cured product pattern. The method can comprise forming an adhesion promoter layer as described above on a substrate. Thereafter, a photocurable composition (for example, a liquid imprint resist) can be applied on top of the adhesion promoter layer and a mold may be brought in contact with the photocurable composition such that the photocurable composition can fill the mold. The mold may contain an original pattern to be transferred, hereinafter also called relief pattern. After the photocurable composition has filled the mold, the photocurable composition can be radiated with light, for example, UV light, to form a photo-cured product. After curing of the photocurable composition, the mold can be removed from the photo-cured product.

In the above-described process, the photo-cured product pattern can have a desired relief pattern (derived from the relief pattern of the mold) in a desired position, and thus, an article having the photo-cured product pattern can be obtained.

The photo-cured product pattern may be used as an interlayer insulating film of a semiconductor device, such as LSI, system LSI, DRAM, SDRAM, RDRAM, or D-RDRAM, or as a resist film used in a semiconductor manufacturing process.

In the embodiment wherein the photo-cured product pattern is used as a resist film, the photo-cured product pattern can function as an etching mask. In a particular aspect, the substrate can contain electronic members and a circuit structure can be formed on the substrate according to the profile of the photo-cured product pattern. Thus, a circuit board used in a semiconductor device or the like can be produced. The resulting circuit board may be connected to a control mechanism for the circuit board for producing an electronic component of a display, a camera, a medical apparatus, or any other apparatus.

Similarly, the photo-cured product pattern may be used as a resist film for etching and/or ion implantation in a process for manufacturing an optical component or a device component, such as a flow channel structure of microfluidics and a patterned medium structure.

Although etching and ion implantation have been described in embodiments as the method for etching the substrate using the photo-cured product pattern as a mask, the method is not limited to these. For example, plating may be performed on the substrate provided with the photo-cured product pattern. In a process for manufacturing a circuit-including substrate or an electronic component, the photo-cured product pattern may be finally removed from the substrate, or may be left as a member of a device.

EXAMPLES

The following non-limiting examples illustrate the concepts as described herein.

Example 1

Adhesion of resist layer on polyimide substrate.

A polyimide film (Upilex S from UBE) having a thickness of 0.2 mm was first subjected to a washing procedure by immersing the polyimide film for 10 minutes in 1M NaOH solution, rinsing with deionized water, immersing the wafer for 10 minutes in 1M HCl solution, and washing again with deionized water. The washed film was dried at room temperature by applying a nitrogen gas flow.

Thereafter, the polyimide film was placed within a vacuum desiccator. The vacuum desiccator had an inner volume of about 0.5 ml and contained 0.5 g of the adhesion promoter positioned at the bottom of the desiccator. A vacuum of about 100 Torr was applied on the desiccator at room temperature, and the polyimide film was maintained for 1 hour within the desiccator to allow vapor deposition of the adhesion promoter on the polyimide film.

As adhesion promoter representative to the present invention was used an isocyanate-group containing compound including an acrylate group, herein also called A-NCO1 (see exact structure in Table 1). Three comparative adhesion promoter materials were used which do not include an isocyanate group but are otherwise known to function as adhesion promoter materials: i) A-Si1 (Comparative Example C1); ii) commercial product A174 from Gelest (Comparative Example C2); and iii) A-TMA (Comparative Example C3). As further comparative sample (sample C4) was used a polyimide film not containing an adhesion promoter layer. See exact structures and summary in Table 1.

TABLE 1

Adhesion of Resist on Polyimide Substrate

| | Substrate | Adhesion Promoter | Coating | Adhesion of Coating |
|---|---|---|---|---|
| S1 | Polyimide | 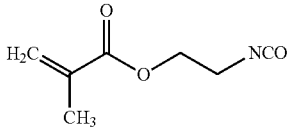 (A-NCO1) | Resist A | strong adhesion |
| C1 | Polyimide | 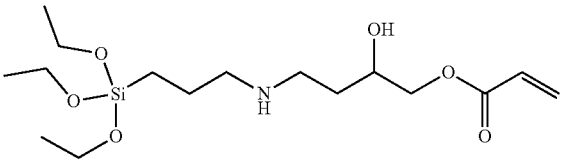 (A-Si1) | Resist A | weak adhesion |
| C2 | Polyimide | 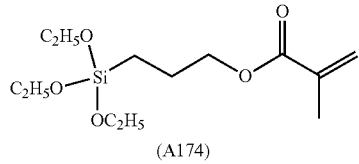 (A174) | Resist A | no adhesion |
| C3 | Polyimide | 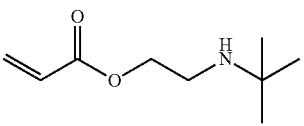 (A-TMA) | Resist A | no adhesion |
| C4 | Polyimide | none | Resist A | no adhesion |

In each experiment, after depositing the adhesion promoter layer as described above, 10 microliter of a liquid photocurable resist composition were dispensed on top of the adhesion promoter layer with a pipette. The liquid photocurable resist composition contained 10 wt % of isobornyl acrylate monomer, 35 wt % of benzyl acrylate monomer, 50 wt % of neopentyl glycol diacrylate monomer, and 2 wt % Irgacure TPO photoinitiator and 3 wt % Irgacure 4265 photoinitiator.

On top of the liquid resist layer was placed a glass slide containing an adhesion layer coating, with the adhesion layer coated side facing the liquid resist. The composition of the adhesion layer coating on the glass slide is described in U.S. Pat. No. 8,557,351, which entire content is incorporated by reference herein.

Thereafter, the liquid resist was cured by UV radiation using a radiation energy of 600 mJ/cm$^2$ to form a solid resist layer. After the curing, the thickness of the solid cured resist layer was about 3 microns.

For the testing of the adhesion strength of the cured resist layer to the polyimide substrate, the applied strength needed for pulling away by hand the polyimide film from the glass slide was tested. Strong adhesion means that a significant force was needed to peel the polyimide film from the glass slide, whereby a small portion of the cured resist film often remained on the polyimide film. Weak adhesion means that only a weak force was needed to peel the polyimide film from the glass slide and no cured resist film stayed on the polyimide film. No adhesion means that only a very minor negligible force was needed to peel the polyimide film from the glass slide and no cured resist film stayed on the polyimide film.

Table 1 summarizes the testing results. It can be seen that when using an adhesion promoter layer containing a compound having both i) an isocyanate group and ii) an acrylate group (A-NCO1 in Sample 51), a strong adhesion of the cured resist to the polyimide film occurred. In contrast, the adhesion promoter layers of comparative examples C1 to C3 provided only a weak or no adhesion improving effect of the cured resist layer to the polyimide film. Moreover, not using an adhesion promoter layer (see comparative Example C4) also did not lead to a sufficient adhesion of the cured resist to the polyimide film.

Example 2

Adhesion of resist layer on silicon substrate.

The experiments were conducted the same way as described in Example 1, except that as substrate was used a silicon wafer instead of a polyimide film.

As summarized in Table 2, it can be seen that an adhesion promoter layer made of compound A-NCO1, i.e., a compound including an isocyanate group and an acrylate group, enabled a strong adhesion of resist A to the silicon wafer.

In contrast, if no adhesion promoter layer was applied, no adhesion of the resist layer was observed.

TABLE 2

Adhesion of Resist on Silicon substrate

| | Substrate | Adhesion Promoter | Coating | Peeling Results of Coating after curing |
|---|---|---|---|---|
| S2 | Silicon | 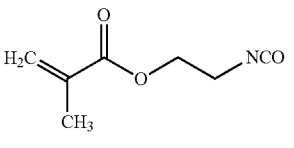 (A-NCO1) | Resist A | strong adhesion |
| C5 | Silicon | none | Resist A | no adhesion |

Example 3

Adhesion of Parylene C layer on polyimide substrate.

The polyimide film (substrate) for applying the adhesion promoter layer and parylene C coating is the same type of polyimide film as used in Example 1. Also the adhesion promoter material representative for the present invention is the same as in Example 1 (A-NCO1).

An about 3 microns thick parylene C coating is applied by vacuum deposition on the adhesion promoter layer of the polyimide film (sample S3). As comparative examples, a layer of adhesion promoter A174 is applied on the substrate (comparative sample C6) before conducting the parylene coating, and a parylene C coating is directly deposited on the polyimide film wherein the polyimide film is not containing an adhesion promoter layer (comparative sample C7).

It is evaluated that the strength of the parylene C coating to the polyimide film is very strong if the adhesion promoter layer is present (sample S3), while only a weak adhesion to the polyimide film is observed for a parylene C coating if commercial adhesion promoter A174 is used (comparative sample C6), and no adhesion is observed for a parylene C coating if no adhesion promoter layer is present on the polyimide film (comparative sample C7), see also summary in Table 3.

TABLE 3

| Substrate | Adhesion Promoter | Coating | Peeling Results of Coating after curing |
|---|---|---|---|
| S3 Polyimide | (A-NCO1) | Parylene C | strong adhesion |
| C6 Polyimide | (A174) | Parylene C | weak adhesion |
| C7 Polyimide | none | Parylene C | no adhesion |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A laminate comprising:
    a substrate;
    an adhesion promoter layer directly overlying the substrate, the adhesion promoter layer including an isocyanate group containing compound of formula (1):
    $R_1$-$R_2$—N=C=O (1), with $R_1$ being a functional group different than the isocyanate group, and $R_2$ being substituted or unsubstituted alkyl or aryl; and
    a coating layer directly overlying the adhesion promoter layer,
    wherein an amount of the isocyanate group containing compound of formula (1) is at least 90 wt % based on the total weight of the adhesion promoter layer, and a thickness of the adhesion promoter layer is at least 0.5 nm and not greater than 100 nm.

2. The laminate of claim 1, wherein $R_1$ of formula (1) is selected from an acrylate group, a methacrylate group, a vinyl group, or a halogen.

3. The laminate of claim 1, wherein the isocyanate group containing compound of formula (1) is selected from

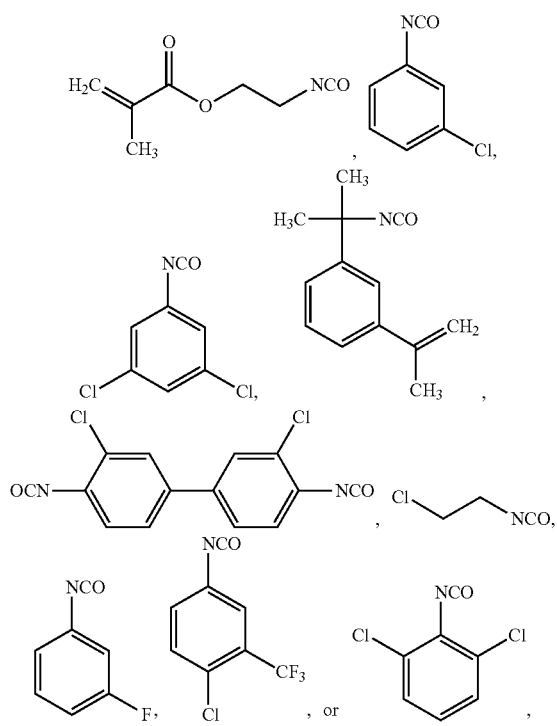

or any combination thereof.

4. The laminate of claim 1, wherein the substrate includes a polymer, silicon, a glass, a ceramic, a metal, or a metal alloy.

5. The laminate of claim 4, wherein the substrate includes an organic polymer.

6. The laminate of claim 5, wherein the substrate includes a polyimide.

7. The laminate of claim 1, wherein the coating layer is a cured resist, the cured resist including polymerized acrylate units and/or polymerized methacrylate units.

8. The laminate of claim 7, wherein the substrate includes a polyimide or silicon.

9. The laminate of claim 1, wherein the coating layer includes a poly(p-xylylene) polymer.

10. The laminate of claim 9, wherein the coating layer includes a chlorinated poly(p-xylylene).

11. The laminate of claim 1, wherein the substrate includes a polyimide and the coating layer includes a chlorinated poly(p-xylylene) polymer.

12. The laminate of claim 1, wherein a molecular weight of the isocyanate group containing compound is not greater than 1000 g/mol.

13. The laminate of claim 1, wherein the amount of the isocyanate group containing compound of formula (1) is at least 99 wt % based on the total weight of the adhesion promoter layer.

14. A method of forming a laminate, comprising:
applying an adhesion promoter layer directly on a substrate, wherein the adhesion promoter layer comprises an isocyanate group containing compound of formula (1): $R_1$-$R_2$—N=C=O (1), with $R_1$ being a functional group different than the isocyanate group, and R2 being substituted or unsubstituted alkyl or aryl, wherein an amount of the isocyanate group containing compound of formula (1) is at least 90 wt % based on the total weight of the adhesion promoter layer, and a thickness of the adhesion promoter layer is at least 0.5 nm and not greater than 100 nm; and
applying a coating layer directly overlying the adhesion promoter layer.

15. The method of claim 14, wherein the method includes forming of covalent bonds between the adhesion promoter layer and the substrate, and forming of covalent bonds between the adhesion promoter layer and the coating layer.

16. The method of claim 14, wherein applying the coating layer includes applying a photocurable composition on the adhesion promoter layer and curing the photocurable composition to form a cured resist.

17. The method of claim 16, wherein the substrate includes a polyimide.

18. The method of claim 16, wherein the substrate includes silicon.

19. The method of claim 14, wherein applying the coating layer includes vapor depositing a poly(p-xylylene) polymer.

20. The method of claim 19, wherein the poly(p-xylylene) polymer includes a chlorinated parylene.

21. The method of claim 20, wherein the substrate includes an organic polymer.

22. The method of claim 21, wherein the substrate includes a polyimide.

* * * * *